(12) United States Patent
Otten et al.

(10) Patent No.: US 12,046,821 B2
(45) Date of Patent: Jul. 23, 2024

(54) RADAR ANTENNA FOR USE IN A MINIATURE UNMANNED AERIAL VEHICLE

(71) Applicant: Nederlandse Organisatie voor toegepast-natuurwetenschappelijk onderzoek TNO, 's-Gravenhage (NL)

(72) Inventors: Maternus Petrus Gerardus Otten, Voorburg (NL); Arnoldus Petrus Maria Maas, 's-Gravenhage (NL); Roland Johannes Bolt, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 730 days.

(21) Appl. No.: 15/734,862

(22) PCT Filed: Jun. 7, 2019

(86) PCT No.: PCT/NL2019/050347
§ 371 (c)(1),
(2) Date: Dec. 3, 2020

(87) PCT Pub. No.: WO2019/235933
PCT Pub. Date: Dec. 12, 2019

(65) Prior Publication Data
US 2021/0242607 A1 Aug. 5, 2021

(30) Foreign Application Priority Data
Jun. 7, 2018 (EP) ..................... 18176550

(51) Int. Cl.
*H01Q 21/20* (2006.01)
*G01S 7/40* (2006.01)
(Continued)

(52) U.S. Cl.
CPC ........... *H01Q 21/20* (2013.01); *G01S 7/4026* (2013.01); *G01S 13/89* (2013.01); *H01Q 1/2283* (2013.01); *H01Q 1/282* (2013.01)

(58) Field of Classification Search
CPC ........ H01Q 21/20; H01Q 1/282; H01Q 1/525; H01Q 3/242; H01Q 3/26; H01Q 19/102;
(Continued)

(56) References Cited

U.S. PATENT DOCUMENTS 4,305,078 A 12/1981 Jones, Jr. et al.
6,104,346 A 8/2000 Rudish et al.
(Continued)

FOREIGN PATENT DOCUMENTS

CN 206180126 U 5/2017
EP 2840650 A1 * 2/2015 ............. H01Q 13/06

OTHER PUBLICATIONS

European Patent Office, International Search Report in corresponding International Application No. PCT/NL2019/050347, dated Sep. 6, 2019 (3 pages).
(Continued)

*Primary Examiner* — Hoang V Nguyen
(74) *Attorney, Agent, or Firm* — Leydig, Voit & Mayer, Ltd.

(57) ABSTRACT

A radar antenna suitable for a drone is provided, which is able to compensate for the agility of drone motion. The radar antenna contains a sandwich of two printed circuit boards between three conductive plates. A first printed circuit board comprises a preferably circular array of first antenna elements such as dipoles. A second printed circuit board, parallel to the first printed circuit board, comprises an array of second antenna elements. One of the array of first antenna elements and the array of second antenna elements is an array of transmission antenna elements and the other an array of reception antenna elements. The first printed circuit board is located below the second printed circuit board. Three conductive plates are used to shape the antenna patterns from the antenna elements so that the main lobes of
(Continued)

the antenna patterns are directed obliquely downwards and the antenna patterns from the different array at least partly overlap, suppressing vertical side lobes. A first conductive plate separates the first and second printed circuit boards. A second conductive plate is located above the second printed circuit board, extending radially outward beyond the first conductive plate. A third conductive plate is located below the first printed circuit board. The first conductive plate extends radially outward beyond the third conductive plate.

14 Claims, 3 Drawing Sheets

(51) Int. Cl.
    *G01S 13/89*     (2006.01)
    *H01Q 1/22*     (2006.01)
    *H01Q 1/28*     (2006.01)

(58) Field of Classification Search
    CPC ...... H01Q 19/17; H01Q 23/00; G01S 7/4026; G01S 13/89
    See application file for complete search history.

(56) References Cited

U.S. PATENT DOCUMENTS

| | | |
|---|---|---|
| 9,640,858 B1 | 5/2017 | Islam et al. |
| 2013/0106667 A1 | 5/2013 | Fenn et al. |

OTHER PUBLICATIONS

M.P.G. Otten et al., "Multichannel Imaging with the AMBER FMCW SAR," 10$^{th}$ European Conference on Synthetic Aperture Radar, pp. 209-212, XP055522488 (Jun. 3, 2014).

* cited by examiner

RADAR ANTENNA FOR USE IN A MINIATURE UNMANNED AERIAL VEHICLE

CROSS-REFERENCE TO RELATED APPLICATIONS

This patent application is a U.S. National Phase of PCT International Application No. PCT/NL2019/050347, filed Jun. 7, 2019, which claims priority to European Application No. 18176550.4, filed Jun. 7, 2018, which are both expressly incorporated by reference in their entireties, including any references contained therein.

FIELD OF THE INVENTION

The invention relates to a radar antenna and a radar system using such an antenna that are suitable to be carried by a miniature UAV (Unmanned Aerial Vehicle).

BACKGROUND ART

Synthetic array radar imaging for use in a UAV is described in an article by Otten et al. titled Multichannel imaging with the AMBER FMCW SAR (EPOI reference XP055522488) published in the proceedings of the 10th European conference on synthetic aperture radar. The radar system includes an eight element reconfigurable transmit antenna located in the upper right corner of the front side of the radar system, and a twenty four element receiver patch array at the bottom of the front side. Furthermore, the radar system comprises an inertial measurement unit. The article describes that the radar system makes it possible to apply various side-looking surface mapping techniques. Results of synthetic aperture surface mapping using data obtained with radar system attached to a helicopter and a motor glider are shown.

However, it is a problem to provide for a radar antenna that is more suitable for surface mapping from a miniature UAV. Miniature UAVs typically weigh less than ten kilograms, and often less than one or two kilograms. In order to be suitable for use in a UAV a light weight radar antenna of limited size is needed. More than helicopters and motor gliders, miniature UAVs exhibit partly unpredictable motion. Miniature rotary-wing UAV's are designed to move in a much more agile manner than larger manned or unmanned aircraft, in the sense that they can rotate very easily, and may change course quickly without changing its absolute orientation, that is, change from forward to sideways motion or vice versa in a fraction of a second.

Suitability for surface mapping from a miniature UAV requires that the combination of the radar antenna and the circuitry for in flight processing of the radar signals is sufficiently light and small to be carried by the miniature UAV. Furthermore, the combination of the miniature UAV and the radar system should be able to handle fast and frequent UAV orientation and course changes.

Various prior art radar antennas are known that may be considered for use in miniature UAVs. WO2011112084 describes a radar antenna with a plurality of reception and transmission antenna elements on an outward facing cylindrical surface, with transmission antenna elements spaced at fixed angle distances and groups of reception antenna elements in the spacings between the transmission antenna elements. This radar antenna makes it possible to receive radar reflections from any radial direction around the cylinder without requiring mechanical rotation. However the antenna is less suited for a surface mapping radar.

US20130106667 describes a high-isolation ring array antenna system for simultaneous transmission and reception. The antenna system has a ring array of transmit antenna elements. The ring array is disposed above a ground plane, and an electrically-conductive cylinder is disposed inside the ring array, above the ground plane and centered on the ring axis. A receive antenna element is disposed on top of the cylinder on the axis of the ring array. The cylinder is higher than the transmit antenna elements, so that the cylinder blocks the line of sight from receive antenna element to the transmit antenna elements. The signal on opposite antenna elements in the ring array differ in phase by 180° so that a radiation pattern null occurs at the central antenna element. As an alternative, two loop antennas emanating from the axis of the ring array on the top plane of the cylinder are disclosed, which operate in counter phase.

U.S. Pat. No. 6,104,346 discloses an antenna for determining a two-dimensional angle-of-arrival that includes circular array interferometers. The interferometers are vertically stacked. Discone antennas in the stack are used in linear interferometers to determine elevation. Each discone antenna contains a concentric disk and frustrated cone, with the cone narrowing toward the disk. The antenna is fed by a ring array with vertically polarized elements or by flared notches on a printed circuit board in the space between the disk and the cone.

U.S. Pat. No. 9,640,858 discloses a wristwatch with an antenna array that is configured to concentrate radiation of radio waves laterally through a radiation plane. The watch contains a conductive cylindrical wall inside its housing and antenna elements located radially outward from the cylinder. A printed circuit board with feed lines that extend radially through the cylinder feeds the antenna elements.

SUMMARY

Among others, it is an object to provide for a miniature UAV with a radar system that is suitable for surface mapping from the miniature UAV.

Among others, it is an object to provide for a radar antenna for a miniature UAV that is able to provide a downward directed beam with steerable azimuth over 360 degrees, and can be constructed without requiring much weight and space, leaving space for processing circuitry.

Among others, it is an object to provide for a compact radar antenna that is suitable for use on a miniature UAV and to provide a radar system comprising such a radar antenna.

A radar antenna according to claim 1 and a miniature UAV with such a radar antenna are provided. Herein a sandwich with three electrically conductive rings or plates are provided to direct the antenna pattern from antenna elements of a transmitter array and a receiver array on printed circuit boards between the rings or plates obliquely downward in an overlapping manner. The rings or plates are able to do so while leaving space for signal generation- and processing circuitry such as transmission or reception electronics on the PCBs inside the rings of antenna elements, so that such processing circuitry does not need to take up further space in the UAV outside the antenna. By combining this with substantially circular arrays of transmission and reception elements the antenna beam pattern can be flexibly adapted to compensate for fast rotation of the UAV. The resulting radar antenna can be realized in a light weight and compact way.

The diameter of the antenna needs to be hardly more than $N*a/PI$, where N is the number of antenna elements in the largest array and their spacing, which is typically about half a wavelength or at most one wavelength of the radar signal. The horizontal diameter of the miniature UAV does not need to be more than about the diameter of the array.

Thus, for example with a 10 GHz radar (wavelength 0.03 m) and an array with N=32 antenna elements at about a half wavelength spacing, the UAV diameter can be less than 0.5 m. More generally, the largest distance between any two points on the circumference of the UAV can be smaller than N times the wavelength divided by PI.

In an embodiment the radar antenna comprises an electrically conductive cylinder, concentric with the central axis, extending between the first electrically conductive ring or plate and third electrically conductive ring or plate, with a diameter smaller than the first distance or the lower limit of the first range of distances. This provides for an electromagnetic shield between the antenna elements on opposite sides of the array, and between optional transmission or reception electronics within the cylinder. Thus signal processing circuitry such as transmission or reception electronics does not need to take up space in the UAV outside the antenna. Furthermore, this helps to suppress transmission and reception from directions opposite to the main direction of transmission and reception. Similarly an electrically conductive cylinder may be provided extending between the first electrically conductive ring or plate and the second electrically conductive ring or plate, with similar advantages.

In an embodiment, the first electrically conductive ring or plate extends radially beyond all positions of all the first antenna elements and all the second antenna elements. This creates a recess running around the antenna structure, with U-shaped cross-section formed between the outer parts of the first and second plates and the cylinder. The second antenna elements are located in this recess, which improves isolation between the receive and transmit arrays.

In an embodiment the lowest electrically conductive ring or plate has the form of a frustrated cone, widening in a direction away from the lowest printed circuit board. This makes it easier to obtain the desired antenna patterns.

The antenna elements in each of the arrays are preferably located at different angles from the central axis (i.e. so that lines from the different antenna elements to where the central axis intersects the plane of the printed circuit board form different angles with each other). This makes it possible to resolve reflections from different direction and to compensate for rotation of the UAV.

In an embodiment the array of first antenna elements and the array of second antenna elements are both circular arrays, the positions of the first antenna elements lying at the same first distance from the central axis, the positions of the second antenna elements lying at the same second distance from the central axis, at least the first and third electrically conductive ring or plate both having a circular outer perimeter. Thus, highly similar patterns in different directions can be realized. In a further embodiment, the second electrically conductive ring or plate may also have a circular outer perimeter. Preferably, the positions of the first antenna elements and/or the second antenna elements are located at evenly spaced angles from the central axis. This provides for an evenly distributed resolution.

In an embodiment the first antenna elements and/or the second antenna elements are dipole antenna elements. Thus each antenna element can be realized as a simple conductor structure on the printed circuit boards.

In an embodiment the array of second antenna elements comprises more antenna elements than the array of first antenna elements. Because the array of second antenna elements can have a larger diameter than the array of first antenna elements space for more antenna elements is available. By using more antenna elements, more angular resolution is made possible. In a further embodiment, the larger number of second antenna elements may be used for reception antenna elements. Reflection signals from these antenna elements may be received separately and processed in parallel to realize higher resolution.

Preferably the antenna element within the first array and within the second array are all used for transmission or all used for reception, the different arrays being used for transmission and reception.

In an embodiment the radar antenna is part of a radar system with a processing system configured to synthesize a radar image of a surface below the radar system from reflected signals received by the reception electronics coupled to the antenna elements from one of the arrays in response to transmissions from the antenna elements of the other one of the arrays.

In an embodiment the radar system comprises an orientation sensor, the transmission electronics and/or the reception electronics and/or the processing system being configured to compensate radar operation for rotation sensed by the orientation sensor.

BRIEF DESCRIPTION OF THE DRAWING

These and other objects and advantageous aspects will become apparent from a description of exemplary embodiments, with reference to the following figures

DETAILED DESCRIPTION OF EXEMPLARY EMBODIMENTS

Figure 1A:
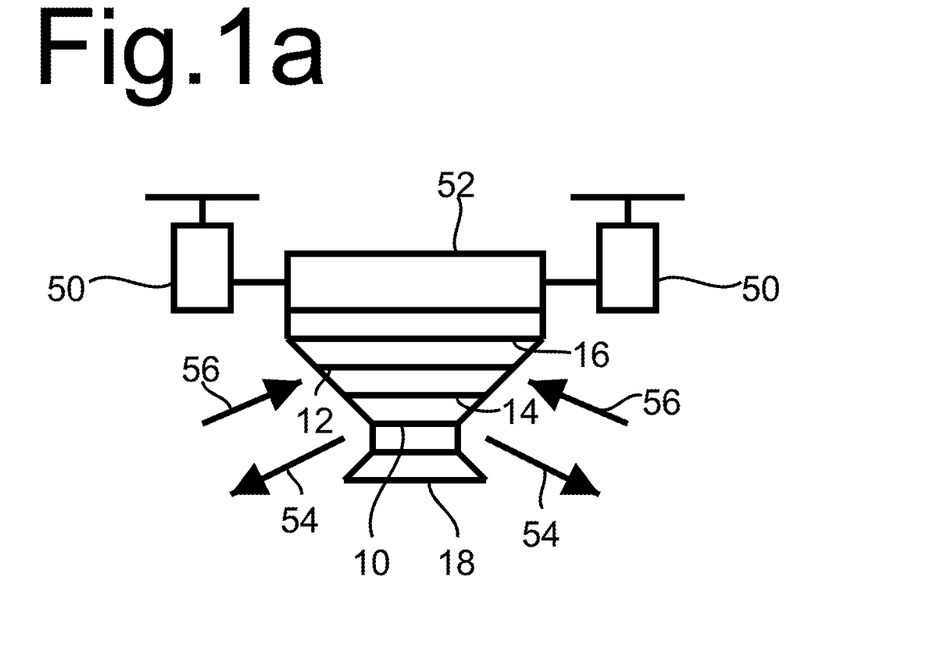
FIG. 1a shows a miniature UAV comprising an antenna

FIG. 1a shows a miniature UAV comprising propellers 50, a UAV body 52 and an antenna structure hanging from UAV body 52. The depicted UAV is an agile rotary-wing UAV, with propellers 50 that are rotated around vertical axes, with the antenna structure positioned horizontally between the rotation axes of propellers 50, so that the UAV has no predetermined horizontal front, side and back relative to horizontal motion. The antenna structure also has no predetermined horizontal front, side and back relative to horizontal motion. The antenna structure is configured to provide transmission and reception antenna patterns with main lobe directions 54, 56 that are directed obliquely downwards, for example at an angle to the vertical between forty five and seventy five degrees. Preferably, downward side lobes along the vertical direction should be minimal, to avoid reception of strong perpendicular reflection from the ground.

Figure 1B:
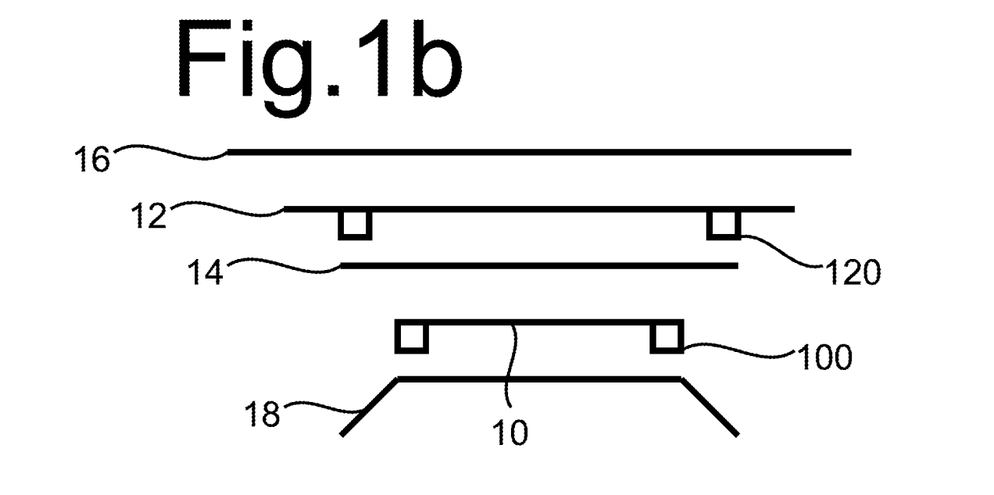
FIG. 1b shows an antenna structure in side view
Figure 2:
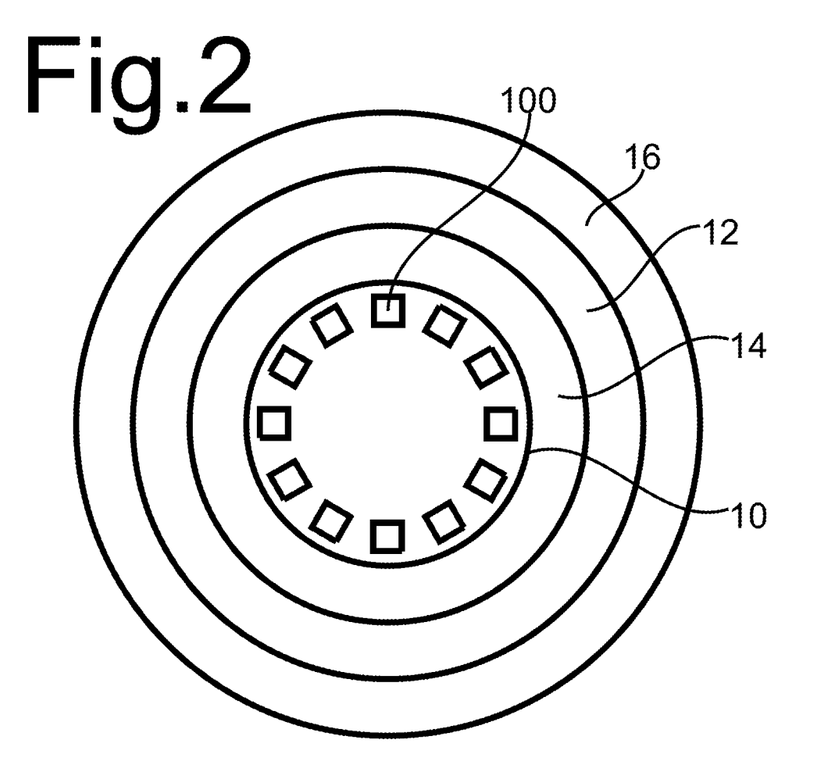
FIG. 2 shows an antenna structure in bottom view

FIGS. 1b and 2 show an exemplary embodiment of an antenna structure in side view cross-section and bottom view respectively. The antenna structure comprises first and second, parallel printed circuit boards 10, 12 and first and second circular arrays of antenna elements on printed circuit boards 10, 12 respectively. In normal use, the surfaces of first and second printed circuit boards 10, 12 will be oriented horizontally, with second printed circuit board 12 above first printed circuit board 10, as shown in FIG. 1a. Preferably, all antenna elements in the first circular array have the same shape, e.g. a dipole shape, and similarly all antenna elements in the second circular array have the same shape. An arbitrary point on an antenna element may be referred to as the position of the antenna element, corresponding points on different antenna elements being referred to as the positions of the different antenna elements. The shapes of the antenna elements in the first circular array may be the same as those in the second circular array, but this is not necessary. Antenna elements 100, 120 will typically consist of conductor planes and/or tracks, e.g. dipoles, on the surface of first and second printed circuit boards 10, 12, but for the sake of illustration they are symbolically indicated as rectangles.

As shown in FIG. 2, a first circular array of transmission antenna elements 100 (only one labeled) along a first circle is provided on first printed circuit board 10. A second circular array of reception antenna elements 120 (not shown in FIG. 2) is provided along a second circle on second printed circuit board 12. The first and second printed circuit boards 10, 12 may be circular as well. Preferably the positions of the antenna elements 100, 120 are evenly spaced along the circles. If the array contains N antenna elements, the positions of the antenna elements may be spaced by three hundred sixty degrees divided by N along the circle. In an embodiment, the first and second circular array contain sixteen and thirty two antenna elements respectively. Preferably, radar wavelengths are used that are larger than the spacing between the positions of the antenna elements, for example with a wavelength between the spacing and twice the spacing.

The first and second arrays are coaxial around a central axis perpendicular to the surfaces of printed circuit boards 10, 12. The radius of the first circular array, i.e. the distance from the central axis to the positions of transmission antenna elements 100 of the first circular array, is smaller than the corresponding radius of the second circular array, containing the reception antenna elements 120. When the first and second printed circuit boards are circular, their radii may be larger than those of the circular arrays.

Furthermore the antenna structure comprises a first and second circular electrically conductive plate 14, 16, in parallel with first and second printed circuit boards 10, 12. First and second circular electrically conductive plate 14, 16 may be made of metal. First electrically conductive plate 14 is located between first and second printed circuit boards 10, 12 and second printed circuit board 12 is located between first and second electrically conductive plate 14, 16, i.e. second electrically conductive plate 16 is located above second printed circuit board 12 in normal use. The antenna structure comprises a further electrically conductive plate 18 (not shown in FIG. 2), e.g. of metal, below first printed circuit board 10. Further electrically conductive plate will also be referred to as a beam shaper. Optionally, as shown further electrically conductive plate 18 has the form of a frustrated electrically conductive cone surface, first printed circuit board 12 being located between first electrically conductive plate 14 and further electrically conductive plate 18. The radius of the electrically conductive cone surface widens with increasing distance from first printed circuit board 12.

The antenna elements 100, 120 of one of the first and second array of antenna elements serve as transmission antennas and the antenna elements 100, 120 of the other array serves as array of antenna elements serves as an array of reception antennas. The elevation angle of the peak strength of the main lobes of the transmission and reception antenna patterns (the angle with the direction normal to the surface of the first and second printed circuit boards) is directed obliquely downward (e.g. at an angle between forty five and seventy five degrees with the vertical), and the main antenna pattern lobes of the reception and transmission antenna patterns at least partly overlap as a function of the elevation angle. The lobe width need not be very narrow. For example a lobe width of about forty degrees may be used. Preferably, downward transmission and/or reception along the vertical direction should be minimal, to avoid reception of strong perpendicular reflection from the ground.

It has been found that conductive plates 14, 16, 18 can be used to ensure these requirements. In general terms, elevation angle of the peak strength of the main lobe of the antenna pattern of antenna elements between an upper and lower conductive plate (e.g. plates 14, 16) becomes more downward directed when the radius of the upper conductive plate (e.g. plate 16) increases and more upward directed when the radius of the lower conductive plate (e.g. plate 14) increases. The effect of changes of the radius of a plate is strongest when the radius of the plate is about the same as the radius of the array of antenna elements between the plates. This allows tuning of the elevation angle of the peak strength of the main lobe. For much larger and much smaller radii the effect levels off. Typically, achieving an obliquely downward directed elevation angle of the peak strength of the main lobe, the radius of the upper conductive plate (e.g. plate 16) will be larger than the radius of the array of antenna elements and the radius of the lower conductive plate (e.g. plate 14) will be smaller than the radius of the array of antenna elements.

To reduce cross-talk between transmission and reception, the radius of first electrically conductive plate 14 should preferably be at least so large that first electrically conductive plate 14 blocks the direct line of sight between antenna elements on first printed circuit board 10 and second printed circuit board 12. Simulation and measurement have shown that first electrically conductive plate 14 does not need to extend further to achieve acceptable cross-talk reduction. Also, the design freedom of the radius of first electrically conductive plate 14 is limited because it acts as upper plate and as lower plate for the antenna elements on first printed circuit board 10 and second printed circuit board 12 respectively, with opposite effect on the lobe direction.

Using a further electrically conductive plate 18 in the form of a frustrated electrically conductive cone surface below first printed circuit board 10 has the advantage that it provides for an additional design parameter (the angle of the cone) that can be used to adjust the elevation angle of the peak strength of the main lobe to make the main antenna pattern lobes of the reception and transmission antenna patterns at least partly overlap as a function of the elevation angle and reduce vertical side lobes. Adjustment of the distance between first and second electrically conductive plates 14 and 16 and between first electrically conductive plate 14 and the top of further electrically conductive plate 18 may be used to adjust the impedance of the antenna elements. If the electrically conductive plates are too close to each other, the impedance may become very small. First and second printed circuit boards 10, 12 may lie midway between the adjacent conductive plates, or their position may be varied to adjust the impedance. Impedance adjustment may be used for example to match the antenna element impedance to the impedance of the transmitter and the receiver circuit. But the antenna pattern also depends on the distance between the plate. Therefore the radii of the plates may be selected for a pre-selected distance.

In the illustrated embodiment, the radius of first circular electrically conductive plate 14 is larger than the radius of the first circular array. The radius of second circular electrically conductive plate 16 is larger than the radius of the second circular array.

The actual dimensions of a concrete antenna may be selected experimentally or by means of simulation, by adjusting the dimensions to obtain at least partly overlapping main lobes in a desired elevation range, and optionally using the dimensions to optimize factors like lobe overlap, lobe width and suppression of lobes in undesired directions (e.g. directly vertical from the antenna). In an embodiment for a 9.8 GHz radar, the requirements were realized using radii of first and second electrically conductive plates 14 and 16 of seventy nine and a hundred twenty two millimeter and further electrically conductive plate 18 having a top radius of forty five millimeter and a bottom diameter of seventy millimeter.

An elevation angle of the peak strength of the main lobe of about fifty five degrees to the downward vertical was realized in this way. In this embodiment, the distance between first and second electrically conductive plates 14 and 16 and between first electrically conductive plate 14 and the top of further electrically conductive plate 18 is twenty millimeter, first and second printed circuit boards 10, 12 lying midway. It should be noted this combination of dimensions is merely an example. Different combinations of dimensions may also be used to obtain obliquely downward directed, at least partly overlapping antenna lobes. For a different frequency radar, the dimensions may be scaled accordingly.

A conical dielectric cover (not shown) may be used over printed circuit boards 10, 12 and first and second circular electrically conductive plate 14, 16 and optionally beam shaper 18. In this embodiment the perimeters of printed circuit boards 10, 12 and first and second circular electrically conductive plate 14, 16 preferably substantially lies on the cone.

Figure 3:
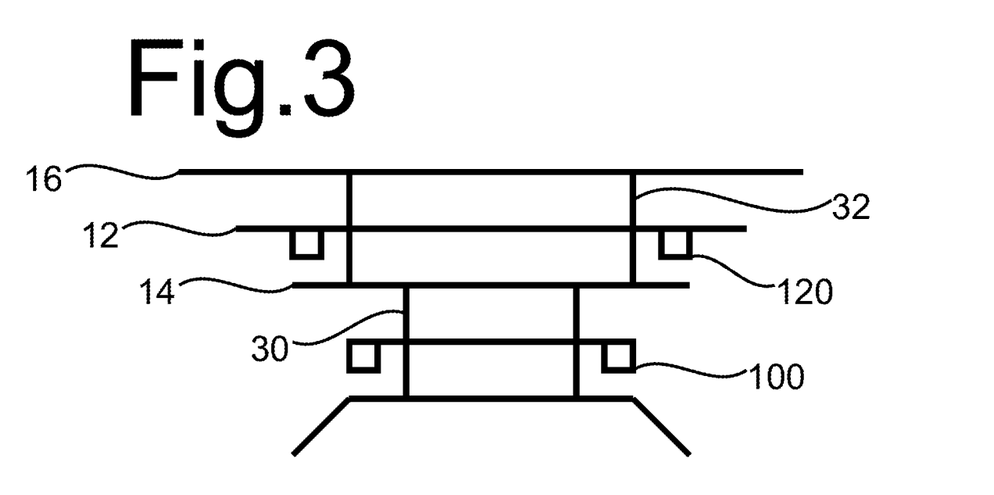
FIG. 3 shows an embodiment with interior cylinders

In the illustrated embodiment first and second circular electrically conductive plate 14, 16 are flat plates and further electrically conductive plate 18 is cone shaped. Instead of a cone shape a curved shape may be used. Another alternative for the cone shape is a flat further electrically conductive plate 18 may be used, but this makes the design possibilities for beam shaping less flexible. Similarly, electrically conductive plate 14, 16 may deviate from flat shapes, e.g. by using a plate with a cone shaped or curved perimeter e.g. a downward or upward curved or angled perimeter. This may make beam shaping slightly more flexible. FIG. 3 shows an embodiment wherein first and second electrically conductive cylinders 30, 32 have been added (e.g. metal cylinders). First and second electrically conductive cylinder 30, 32 extend between further electrically conductive plate 18 and first electrically conductive plate 14 and from first electrically conductive plate 14 to second electrically conductive plate 16 respectively. Second electrically conductive cylinder 32 electrically connects first and second electrically conductive plates 14, 16. First electrically conductive cylinder 30 electrically connects first electrically conductive plate 14 and further electrically conductive plate 18. In an embodiment, first and second electrically conductive plates 14, 16 and further electrically conductive plate 18 extend through the interior of first and second electrically conductive cylinder 30, 32. Alternatively, one or more of first and second electrically conductive plates 14, 16 and further electrically conductive plate 18 may be present only outside first and/or second electrically conductive cylinder 30, 32.

The axis of first and second electrically conductive cylinder 30, 32 coincides with the central axis of the circular arrays. The radius of first electrically conductive cylinder 30 is smaller than the radius of the first circular array, so that the transmission antenna elements 100 lie outside first electrically conductive cylinder 30. The radius of second electrically conductive cylinder 32 is smaller than the radius of the second circular array, so that the reception antenna elements 120 lie outside second electrically conductive cylinder 32. First and second electrically conductive cylinder 30, 32 serve as electromagnetic shields between antenna elements 100, 120 and electronics within first and second electrically conductive cylinder 30, 32, and counteract wave propagation between the conductive plates, e.g. from the side in the direction from which a reflected wave arrives to an antenna element on the opposite side of the plate. Preferably, the radius of second electrically conductive cylinder 32 is larger than the radius of first electrically conductive cylinder 30.

First and second printed circuit boards 10, 12 are mechanically connected to first and second electrically conductive cylinder 30, 32 respectively. In an embodiment, first electrically conductive cylinder 30 may comprise two cylinder parts, connected to the upper and lower surfaces of first printed circuit board 10. In another embodiment, first printed circuit board 10 may contain two or more parts fitted through slots in first electrically conductive cylinder 30. Mutatis mutandis, the same constructions may be used for second electrically conductive cylinder 32 and second printed circuit board 10.

Figure 4:
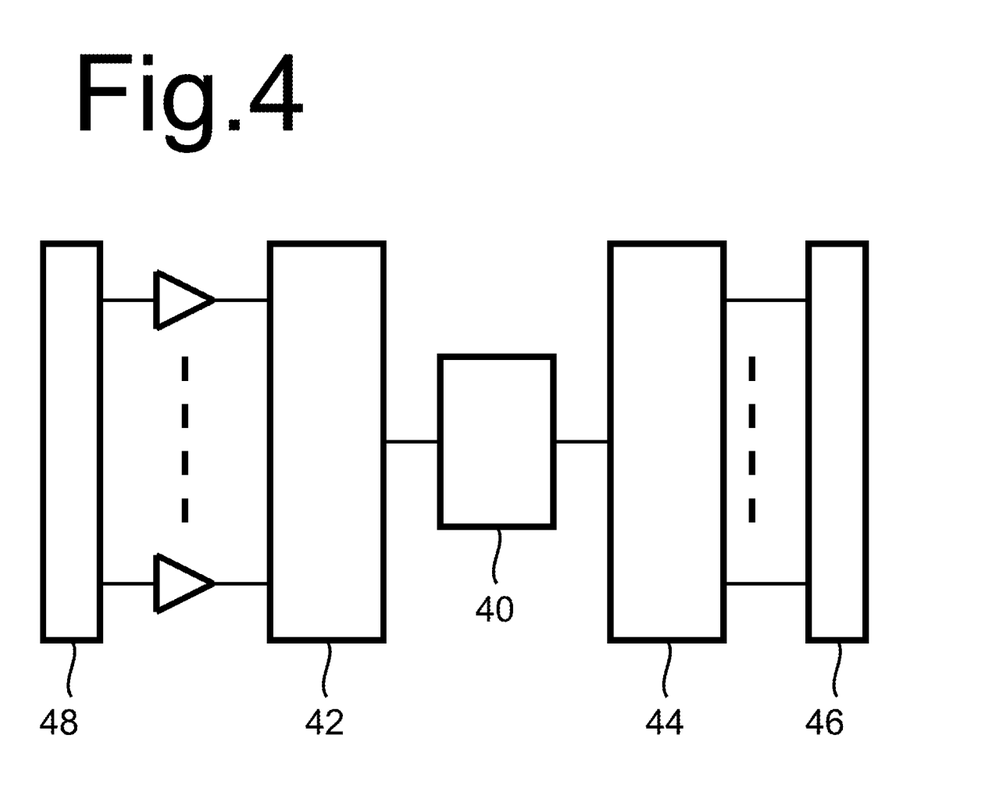
FIG. 4 shows a radar system

FIG. 4 shows a radar system, comprising the first and second circular array 46, 48, a processing system 40 and reception and transmission electronics 42, 44. Processing system 40 is coupled to reception and transmission electronics 42, 44. Although connection lines are shown, it should be noted that wireless coupling may be used and that processing system 40 may be located remotely from reception and transmission electronics 46, 48, e.g. in a ground based control unit. Processing system 40 may comprise one or more programmable computers and storage device(s) with computer programs to make the one or more programmable computers perform the functions of processing system 40.

Reception electronics 42 has inputs coupled to the reception antenna elements of second circular array 48. By way of example amplifiers have been shown between reception electronics 42 and the reception antenna elements, which may be considered to be part of reception electronics 42. Transmission electronics 44 has outputs coupled to the transmission antenna elements of first circular array 46. Transmission electronics 44 may contain output amplifiers (not shown) with outputs coupled to the transmission antenna elements.

Transmission electronics 44 may be located on first printed circuit board 10 at least partly inside first electrically conductive cylinder 30. Reception electronics 42 may be located on second printed circuit board 12 at least partly inside second electrically conductive cylinder 32. Processing system 40 may be located on either, or distributed over both or remotely.

In operation, a UAV carries the antenna structure. As shown in FIG. 1, the UAV may comprise a plurality of propellers attached to a body that carries the antenna structure, the plurality of propellers being configured to provide upward trust. Processing system 40 causes transmission electronics 44 to supply transmission signals to the transmission antenna elements in first circular array. In an embodiment transmission electronics 44 may be configured to generate frequency modulated transmission signals for FMCW (frequency modulated continuous wave) radar operation. In an embodiment transmission electronics 44 are configured to supply a transmission signal to a one of transmission antenna element at a time, successively to different ones of the transmission antenna elements to steer the transmitted beam in successively different directions. In another embodiment, the same transmission signal may be supplied simultaneously to a plurality of transmission antenna elements to form an antenna beam from plurality of transmission antenna elements, optionally with adapted phase and/or amplitudes to direct or shape the beam. The resulting beam is directed radially and downward from the antenna structure, with a peak as function of radial direction. Transmission electronics 44 may be configured to scan the beam direction along a series of radial directions.

Because the transmission antenna elements are located in an array at different angles from the central axis (i.e. so that lines from the different antenna elements to where the central axis intersects the plane of the printed circuit board form different angles with each other), the radial direction of the antenna pattern can easily be steered to compensate for rotation around the axial direction due to rotation of the UAV that carries the antenna structure. The UAV may comprise a plurality of propellers in a same horizontal plane, located at positions along a vertical projection of the periphery of the antenna structure on that plane, wherein the propellers rotate around vertical axes. In order to be suitable for such a UAV, the antenna has to be small and light weight so that the propellers are able to keep the antenna in the air Such a UAV can unpredictably rotate around the vertical direction, even while the UAV moves in a straight line, or change course without turning. An antenna that has the ability to compensate for this by electronically adapting the beam direction has the advantage that it makes it possible to overcome the effect of unpredictable movement and rotation. In an embodiment, the antenna structure contains a sensor in the UAV for measuring a rotation angle of the antenna structure around the axial direction, the sensor being coupled to transmission electronics 44. The transmission electronics 44 may be configured to adapt the beam direction in response to sensed angle changes so as to compensate the radial direction the beam for rotation of the antenna structure. The beam direction can be adapted by shifting the assignment of different transmitted signals to antenna elements along the circular array, and optionally by shifting the relative phase of the signals.

Reception electronics 42 receives reflection signals from the reception antenna elements. Preferably, reception electronics 42 processes reflection signals from a plurality of reception antenna elements in parallel. When FMCW is used, the reflection signals may be mixed with a copy of the transmitted signals to obtain beat signals with frequency components corresponding to objects at different distances. By computing linear combinations of the reflection signals before or after mixing (preferably digitally), radial direction selective reflection signals may be computed. Because the reception antenna elements are located in an array at different angles from the central axis, signals from a combination of reception antenna elements can be used to resolve reflections from different radial directions. Reception electronics 42 or processing system 40 may be configured to compensate the reflection signals for sensed rotation, like the transmission signals, e.g. by summing reflection signals that have been multiplied by factors determined using the sensed rotation angle, according to predetermined functions of the rotation angle, or by accounting for the rotation in radar image computation. In addition, the UAV may be moved and processing system 40 may be configured to combine results from reflection signals obtained at different positions to construct a synthetic radar image.

It is preferred to use the antenna elements on first printed circuit board 10 as transmission antenna elements and the antenna elements on second printed circuit board 12 as reception antenna elements. Because second printed circuit board 12 has a larger radius, more antenna elements can be provided on second printed circuit board 12, enabling use of signal processing to obtain a higher resolution. Alternatively, the antenna elements on first printed circuit board 10 may be used as reception antenna elements and the antenna elements on second printed circuit board 12 as transmission antenna elements.

Although embodiments with circular arrays on printed circuit boards 10, 12 have been shown, wherein the distance from the position of each antenna element to the central axis of the array is the same, alternatively the distances may vary within a predetermined range of distances, such as in a polygonal or elliptical array, and/or the angular spacing between the positions of successive antenna elements may vary. It is preferred that the antenna elements are positioned so that, for any given orientation of the antenna structure the antenna elements in the arrays can be selected to transmit and receive waves in all radial directions relative to the antenna. The distances and/or spacing may be different on the first and/or second printed circuit board 10, 12.

The invention claimed is:
1. A miniature unmanned aerial vehicle (UAV) comprising:
a plurality of propellers configured to provide upward thrust;
a UAV body connected to the propellers;
a radar system hanging from the UAV body, the radar system comprising a radar antenna comprising:
a first printed circuit board having a first array of antenna elements situated at positions thereon, wherein the positions of antenna elements of the first array of antenna elements lie within a first predetermined distance range from a central axis perpendicular to the first printed circuit board, and wherein individual antenna elements of the first array of antenna elements each lie in differing directions from the central axis;
a second printed circuit board, which is above and parallel to the first printed circuit board, wherein the second printed circuit board has a second array of antenna elements situated at positions therein, wherein the positions of antenna elements of the second array of antenna elements lie within a second predetermined distance range from the central axis, wherein individual antenna elements of the second array of antenna elements each lie in differing directions from the central axis, and wherein first element distances in the first predetermined distance range are smaller than second element distances in the second predetermined range;
wherein the radar antenna further comprises:
a first electrically conductive ring or plate that is:
located between the first printed circuit board and the second printed circuit board, and
configured to block lines of sight from the antenna elements of the first array to the antenna elements of the second array; and
a second electrically conductive ring or plate;

wherein the second printed circuit board lies between the second electrically conductive ring or plate and the first electrically conductive ring or plate, and wherein the second electrically conductive ring or plate extends radially outward beyond the first electrically conductive ring or plate; and a third electrically conductive ring or plate, wherein the first printed circuit board lies between the third electrically conductive ring or plate and the first electrically conductive ring or plate, and wherein the first electrically conductive ring or plate extends radially outward beyond the third electrically conductive ring or plate;

transmission and reception electronics respectively coupled to the first array of antenna elements and the second array of antenna elements, or respectively coupled to the second array of antenna elements and the first array of antenna elements, the transmission electronics being configured to form an antenna beam having a beam direction;

wherein the miniature UAV comprises an orientation sensor for measuring a rotation angle of the radar antenna around the central axis, and wherein the transmission electronics are configured to adapt the beam direction in response to angle changes sensed by the orientation sensor so as to compensate the beam direction for rotation of the radar antenna.

2. The miniature UAV according to claim 1, further comprising an electrically conductive cylinder that is concentric with the central axis and extends between the first electrically conductive ring or plate, the first electrically conductive ring or plate extending radially beyond the electrically conductive cylinder, and the third electrically conductive ring or plate, wherein the electrically conductive cylinder has a radius smaller than a lower distance limit of the first predetermined distance range, so that all antenna elements of the first array of antenna elements lie radially outside the electrically conductive cylinder.

3. The miniature UAV according to claim 2, wherein the transmission electronics are situated on the first printed circuit board and within the electrically conductive cylinder, wherein the first antenna elements are transmission antenna elements that are coupled to the transmission electronics.

4. The miniature UAV according to claim 1, further comprising an electrically conductive cylinder that is concentric with the central axis and extends between the first electrically conductive ring or plate and the second electrically conductive ring or plate, wherein the electrically conductive cylinder has a radius smaller than a lower distance limit of the second predetermined distance range, so that all antenna elements of the second array of antenna elements lie radially outside the electrically conductive cylinder.

5. The miniature UAV according to claim 4, wherein the reception electronics are situated on the second printed circuit board and within the electrically conductive cylinder, wherein the second antenna elements are reception antenna elements that are coupled to the reception electronics.

6. The miniature UAV according to claim 1, wherein the first electrically conductive ring or plate extends radially beyond radial positions of all the antenna elements of the first array of antenna elements and all the antenna elements of the second array of antenna elements.

7. The miniature UAV according to claim 1, wherein the third electrically conductive ring or plate has a frustrated cone form and widens in a direction away from the first printed circuit board.

8. The miniature UAV according to claim 1, wherein the first array of antenna elements and the second array of antenna elements are both circular arrays, wherein positions of antenna elements of the first array of antenna elements lie at a same first distance from the central axis, wherein positions of antenna elements of the second array of antenna elements lie at a same second distance from the central axis, wherein at least the first electrically conductive ring or plate and the third electrically conductive ring or plate both have a circular outer perimeter.

9. The miniature UAV according to claim 1, wherein positions of antenna elements of the first array of antenna elements and/or positions of antenna elements of the second antenna elements are located at evenly spaced angles in relation to the central axis.

10. The miniature UAV according to claim 1, wherein the antenna elements of the first array of antenna elements and/or the antenna elements of the second array of antenna elements are dipole antenna elements.

11. The miniature UAV according to claim 1, wherein the second array of antenna elements comprises more antenna elements than the first array of antenna elements.

12. The miniature UAV according to claim 1, further comprising a processing system configured to synthesize a radar image of a surface below the radar system from reflected signals received by the reception electronics.

13. The miniature UAV according to claim 1, further comprising a processing system, wherein the transmission electronics and/or the reception electronics and/or the processing system are configured to compensate radar operation for rotation sensed by the orientation sensor.

14. The miniature UAV according to claim 1, further comprising a processing system, and wherein the reception electronics or the processing system of the miniature UAV are configured to compensate reflection signals for sensed rotation, by summing reflection signals that have been multiplied by factors determined using the sensed rotation angle, according to predetermined functions of the rotation angle, or by accounting for the rotation in radar image computation.

* * * * *